(12) United States Patent
Park

(10) Patent No.: US 8,314,963 B2
(45) Date of Patent: Nov. 20, 2012

(54) PRINTING INFORMATION SERVICE SYSTEM AND METHOD BASED ON RFID TECHNOLOGY

(75) Inventor: Sung-ha Park, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 986 days.

(21) Appl. No.: 12/316,682

(22) Filed: Dec. 16, 2008

(65) Prior Publication Data

US 2009/0195812 A1    Aug. 6, 2009

(30) Foreign Application Priority Data

Feb. 5, 2008   (KR) .................. 10-2008-0011966

(51) Int. Cl.
*G06F 3/12*   (2006.01)
*G06K 15/00*  (2006.01)

(52) U.S. Cl. ..................... 358/1.15; 358/1.14
(58) Field of Classification Search ............ 358/1.1, 358/1.13, 1.14, 1.9, 1.15, 500, 474, 48; 709/203; 707/627, 706; 705/52, 330
See application file for complete search history.

(56) References Cited

U.S. PATENT DOCUMENTS

| 7,242,847 | B1 | 7/2007 | Davies et al. | |
| 2004/0184063 | A1* | 9/2004 | Baldwin | 358/1.13 |
| 2005/0029350 | A1* | 2/2005 | Jusas et al. | 235/451 |
| 2005/0152544 | A1 | 7/2005 | Kizawa | |
| 2006/0251431 | A1* | 11/2006 | Lee | 399/16 |
| 2007/0195364 | A1* | 8/2007 | Umehara et al. | 358/1.15 |
| 2007/0242301 | A1* | 10/2007 | Tsuchie et al. | 358/1.14 |
| 2008/0238673 | A1* | 10/2008 | Gopalan et al. | 340/572.1 |
| 2010/0241467 | A1* | 9/2010 | Saw et al. | 705/5 |

FOREIGN PATENT DOCUMENTS

| EP | 1653414 A2 * | 5/2006 |
| KR | 10-2005-0073509 A | 7/2005 |

OTHER PUBLICATIONS

Office Action established for CN 200910003905.3 (Jul. 11, 2012).

* cited by examiner

*Primary Examiner* — Gabriel Garcia
(74) *Attorney, Agent, or Firm* — Drinker Biddle & Reath LLP

(57) ABSTRACT

A printing information service system and a method of providing printing information, based on radio frequency identification (RFID) technology. The system and method retrieve a printing status of a user of a printer, locate the user from among users each having a RFID card by determining whether personal identification information stored in the RFID card of the user is acquired depending on a communicating distance between the RFID reader equipped in the printer and the RFID card of the user, and provide information by displaying the printing status of the user identified by the personal identification information, on the printer, when the personal identification information is acquired as a result of the determining. The system and method provide printing information to different locations of the user, and individually informs the print completion status, thus greatly improving the convenience of printing by the user.

18 Claims, 3 Drawing Sheets

PRINTING INFORMATION SERVICE SYSTEM AND METHOD BASED ON RFID TECHNOLOGY

CROSS-REFERENCE TO RELATED PATENT APPLICATION

This application claims the benefit of Korean Patent Application No. 10-2008-0011966, filed on Feb. 5, 2008, in the Korean Intellectual Property Office, the entire content of which is incorporated herein by reference.

BACKGROUND OF THE INVENTION

1. Field of the Invention

The present invention relates to a printing information service system and method based on radio frequency identification (RFID) technology. More particularly, the present invention relates to a printing information service system and a printing information service method based on RFID technology, wherein the method and system provide printing information to different locations of the user and individually inform of a print completion status once printing is complete, thereby improving the convenience of a printing operation from the point of the user.

2. Description of the Related Art

In a typical office environment, a small number of printers are often shared by groups of users through a network. Such network printers process printing tasks continuously requested from a large number of users on a first-input, first-output basis, and for each user requesting a print task, there is no method of knowing printing information in detail in terms of an amount of data or a processing order of documents or images subject to printing that are currently accumulated in the printer. That is, each user does not know an overall printing status regarding whether the print task the user has requested is already completed, being printed, or waiting for a preceding print task to be processed, according to the current print task processing status. Thus, the printer has to be repeatedly approached by the user to verify the content of the papers being printed. Moreover, a technological tool which individually notifies the completion of print tasks has not been established, and thus the user spends a long time in front of the printer waiting for the printing to complete, or the prints are left for a long time on the feeding tray of the printer because the user has not collected the prints.

SUMMARY OF THE INVENTION

The present invention provides a printing information service system and a printing information service method based on radio frequency identification (RFID) technology, wherein the method and system provide real time or substantially real time information related to a printing status to a user commanding a print task and thus enhance print task efficiency for the user. The present invention also provides a printing information service system and a printing information service method based on RFID technology, wherein the method and system actively locate a current location of the user and provide printing information to the located current location of the user, and thus convenience the user. The present invention also provides a printing information service system and a printing information service method, the method and system guiding each user to immediately collect his or her prints by providing an individual print completion alarm to the user once a printing task is complete.

Accordingly, an embodiment of the present invention provides a printing information service method including the steps of detecting an printing status of printing tasks requested from users, with each user having a radio frequency identification (RFID) card, determining whether a RFID reader equipped in the printer detects the RFID card of each user, depending on a communicating distance between the RFID reader and the RFID card of each user and providing information by displaying, on the printer, the printing status of the user whose RFID card is detected. The printing information service method may further include displaying, on a terminal of the user, the printing status of the user whose RFID card is not detected.

The personal identification information may be a unique ID registered to each RFID card, so as to identify each card holder among users sharing the printer. Also, the information regarding the printing status may include at least one type of information from among print completion, print progress, and estimated time of print completion. In this case, the print progress may be displayed in a quantitative percentage of the data completed printing with respect to the total data of a printing task requested by the user.

Another embodiment of the present invention provides a printing information service method including the steps of determining whether a preset stand-by time has elapsed after printing is complete, determining whether a radio frequency identification (RFID) reader equipped in the printer detects the RFID card of a user whose printing is complete, depending on a communicating distance between the RFID reader and the RFID card of the user when the stand-by time is determined to be elapsed, and providing information, through the printer, by notifying the print completion status of the user, when the RFID card of the user is detected. The printing information service method may further include displaying on a terminal the print completion status of the user whose RFID card is not detected. Also, when providing the information, the printer may produce a preset alarm, or the printer may display a print completion message through a display screen.

A further embodiment of the present invention provides a printing information service system including at least one terminal for generating a printing data according to the print requests of a user, a printer equipped with a radio frequency identification (RFID) reader, for performing a printing task by acquiring the print data, an RFID card for transmitting a personal identification information of a cardholder of the RFID card depending on a communication distance of the RFID card with the RFID reader, and a network server indicating a printing status of the user represented by the personal identification information, on the printer. In this example, the network server may display on a display screen of the terminal, the printing status of the user, if the personal identification information is not acquired according to the communication distance between the RFID reader and the RFID card.

The printer may include a printing status monitor in order to generate a status data relating to the printing status of the user. In this example, the status data may include at least one type of information from among printing completion, print progress, and estimated time of print completion. Furthermore, the print progress may present, in a current print task being processed, a quantitative percentage of the data completed printing with respect to the total data of the printing task requested by the user. The total data of the print task may be an entire data of each print task that enter the printer through a network interface. Also, the printer can include a printing data storing unit which temporarily stores the data received from a plurality of terminals connected to a network, and the print data that completed printing may be determined based on the amount of data remaining in the storing unit, not yet processed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described more fully with reference to the accompanying drawings, in which embodiments of the invention are shown.

Figure 1:
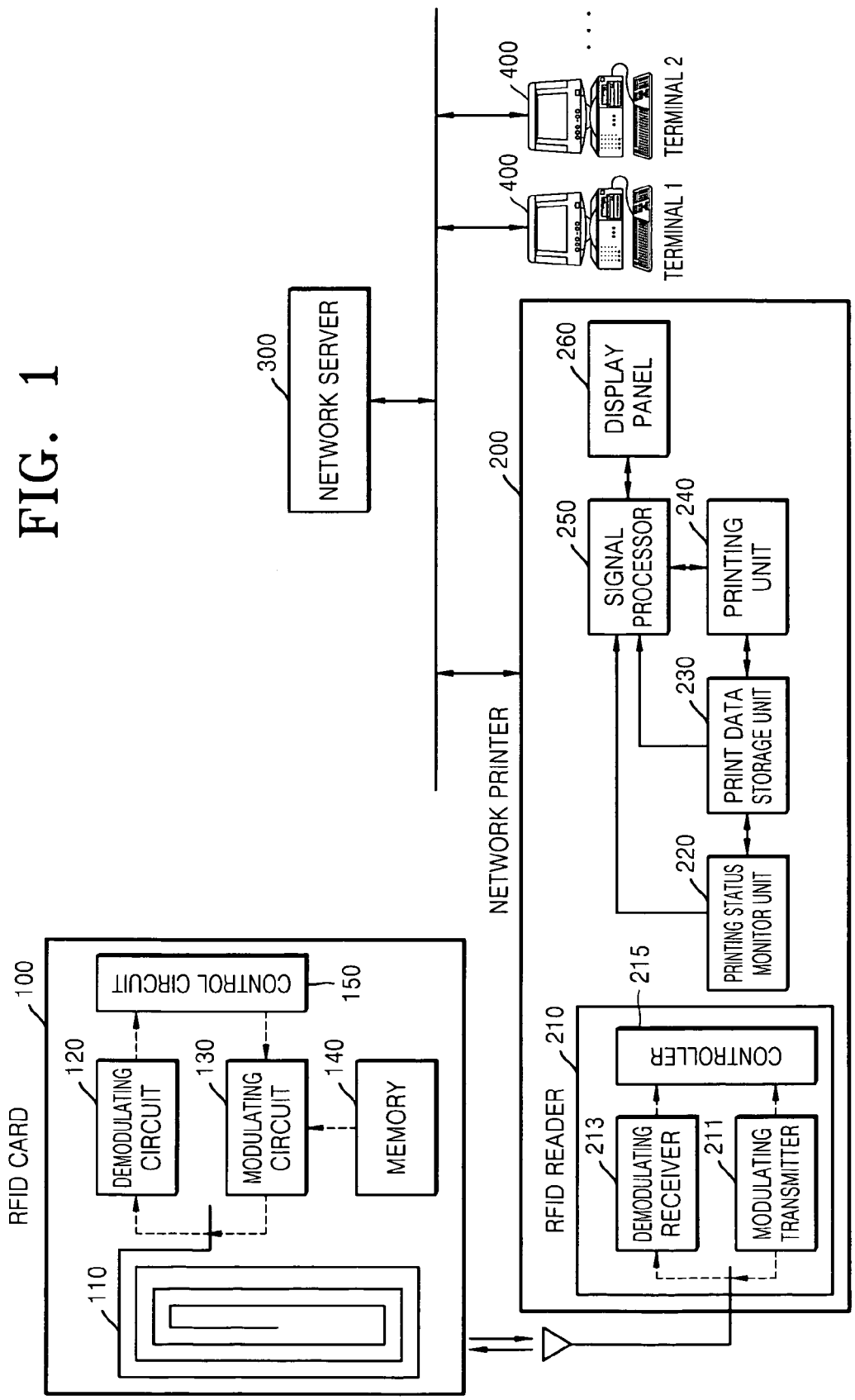
FIG. 1 is a block diagram illustrating an example of a functional structure of a printing information service system according to an embodiment of the present invention.

FIG. 1 is a block diagram illustrating an example of a functional structure of a printing information service system according to an embodiment of the present invention. The printing information service system shown includes at least one terminal 400 on which a user can execute an application according to an operation of the user, and produces printing data to transfer to a printer 200, and a radio frequency identification (RFID) card 100 possessed by a user, for storing personal identification information ID of the user. The printer 200 includes an RFID reader 210 which reads the personal identification information ID of the user by executing a short-distance wireless communication (RF communication) with the RFID card 100 once the RFID card 100 approached within a distance of recognition of the RFID reader 210, while printing print data. The printing information service system further includes a network server 300 connected to a network so as to be communicable with the printer 200 and the terminal 400.

The RFID card 100 refers to an RFID tag, also called a transponder, and the RFID card 100 responds with detailed information stored in the RFID card 100 upon paging by the RFID reader 210 through, for example, wireless communication. Moreover, the RFID card 100 may actually be in various other forms and thus is not limited to a card shape, as long as the various other forms have a structure appropriate for wireless communication with the RFID reader 210. The RFID card 100 receives information request signals from the RFID reader 10, and extracts a user ID data stored in its memory 140, modulates the extracted user ID data into a signal with a specific frequency range, such as a high frequency (HF) of 13.56 MHz, or mainly an ultra-high frequency (UHF) in the range of at or about 850 MHz to at or about 950 MHz, and sends the signal to the RFID reader 210.

For example, the RFID card 100 may be manufactured as a multi-functional card such as a credit card having a bill payment function or a personal identification card on which personal information of a user is recorded, and the user carries the RFID card 100 with him/her so that the RFID card 100 can wirelessly communicate with the RFID reader 210, depending on a distance between the RFID card 100 and the RFID reader 210. Here, the distance of recognition at which the RFID card 100 is detected by the RFID reader 210 so as to communicate with each other may reach, for example, 10 cm or about 10 cm-to 50 cm or about 50 cm in a HF system of at or about 13.56 MHz, and may reach 3 m or about 3 m to 4 m or about 4 m in an UHF system in the range of at or about 860 MHz to at or about 950 MHz. In this embodiment of the present invention, the RFID reader 210 detects the RFID card 100 once the RFID card 100 entered within a range of detection, and thus it can be identified whether the RFID card 100 is located within the range of detection, or is located outside the range of detection.

In this embodiment, if the RFID card 100 is determined to be within the range of recognition, that is, the RFID card is recognized by the RFID reader 210, it can be determined that the user is close to the printer 200 and therefore, a printing status is shown on a display panel 260 of the printer 200. Otherwise, if the RFID card 100 is determined to be outside the range of recognition, that is, the RFID card 100 is not recognized by the RFID reader 210, it can be determined that the user is outside the range of recognition and is in front of his of her own terminal 400, thus the printing status is shown on a display screen of the terminal 400.

In the case where the distance of recognition between the RFID reader 210 and the RFID card 100 is preset to be too small, it is possible that the RFID card 100 may only be detected at a distance close enough to be almost in contact with the RFID reader 210, and for example, an amount of exposure of the RFID card 100 according to the mode of carrying the RFID card 100 by the user, or a relative orientation between the RFID reader 210 and the RFID card 100, may affect the recognizability of the RFID card 100 by the RFID reader 210, and hence the ability of recognition may decrease. In contrast, in the case where the maximum distance of recognition between the RFID reader 210 and the RFID card 100 is preset to be too long, for example, the entire group of RFID cards 100 within the office space is recognized by the RFID reader 210, and thus the location of the user may not be determined in a short-distance or a long-distance. Considering such problems, preferably the RFID system being applied in the embodiments of the present invention has an optimized distance of recognition between the RFID reader 210 and the RFID card 100, and may be, for example, be preset to be at or around 1 m.

Also, the RFID card 100 may include an integrated circuit chip in which the personal identification information ID is registered in order to identify the cardholder from a group of users, and an antenna 110 electrically connected to the integrated circuit chip and formed in a predetermined pattern. The integrated circuit chip may include the memory 140 storing the user ID data of the cardholder, a demodulating circuit 120 which converts an information request signal of the RFID reader 210 into readable digital data, a modulating circuit 130 which converts the user ID data stored in the memory 140 into a high frequency signal so as to transmit the high frequency signal through the antenna 110, and a control circuit 150 for controlling the units of the RFID card 100 above. The RFID card 100 may be implemented in 2 different types, either as an active type which produces driving power by itself by including a battery (not shown), or as a passive type which converts the information request signals received from the RFID reader 210 into a DC voltage signal so as to use the DC voltage signal as a driving power. However, in order to achieve a card with a form of a thin-film, the passive type may be more suitable since the passive type does not require any additional elements such as a battery.

The printer 200 according to an embodiment of the present invention may be a network printer, which is shared by a group of users in an environment in which network connections such as the Internet or a LAN are provided, and assigned a separate IP address. The printer 200 receives print data from the terminals 400 through the network, and performs the print tasks on, for example, a first-input, first-output basis. For example, the print data received from the plurality of terminals 400 are stored temporarily in a print data storage unit 230, and transferred to the printing unit 240 according to a process queue. The data flow between the print data storage unit 230 and the printing unit 240, and the overall actions of each of the units may be controlled by a signal processor 250. The printing unit 240, in order to print the transferred print data to a paper, may be implemented as different mechanisms, including an electrophotographic image-forming mechanism which uses a electropotential difference of a latent image formed in a photosensitive drum, an inkjet image-forming mechanism which ejects the ink liquid on a printing paper, and a thermal transfer image-forming mechanism which selectively heats a dye material on a printing paper to express a predetermined image.

The printer 200 is equipped with the RFID reader 210 which performs short-distance wireless communication with the RFID card 110 and reads out the stored information in the RFID card 100. The RFID reader 210 includes a modulating transmitter 211 which modulates information request signals into a high frequency signal in an assigned frequency band and transmits the high frequency signal; a demodulating receiver 213 which demodulates the user ID data received from the RFID card 100, into readable digital data; and a controller 215. The RFID reader 210 recognizes that the RFID card 100 has approached close to the printer 200, by transmitting an information request signal and receiving a corresponding response signal from the RFID card 100 within the distance of recognition. The RFID reader 210 transfers the personal identification information ID received from the RFID cards 100 that approached the printer 200 to the network server 300. The network server 300 is able to recognize the user that is in proximity from the printer 200, according to the personal identification information ID received from the RFID reader 210.

The printer 200 may further include a printing status monitor unit 220 for detecting the printing status. For example, the printing status monitor unit 220 generates status data which includes information regarding whether the printing of the print data sent from each terminal 400 has been completed, or the print data is standing by until a previously sent print task is processed. The status data may include, as shown in Table 1 below, information regarding the print task progress and the estimated time of print completion.

TABLE 1

| Task No. | User ID | Print Pages | Print Task Progress | Estimated time of print completion |
|---|---|---|---|---|
| Task 6 | User 6 | 0/11 | Null | 462 sec (7 min 42 sec) |
| Task 5 | User 5 | 0/10 | Null | 429 sec (7 min 9 sec) |
| Task 4 | User 4 | 0/20 | Null | 399 sec (6 min 39 sec) |
| Task 3 | User 1 | 0/10 | Null | 339 sec (5 min 39 sec) |
| Task 2 | User 2 | 0/100 | Null | 309 sec (5 min 9 sec) |
| Task 1 | User 3 | 7/10 | 70% | 9 sec |

Referring to Table 1, a total of 6 tasks, Task 1 to Task 6, were requested from 6 different users each having IDs of user 1 to user 6, and Task 1 is being processed is 5 first according to the first-input, first-output basis, and the remaining print tasks of Task 2 to Task 6 are in print stand-by. Information regarding the print task progress may be represented as a relative percentage (%) of the print data completed printing out of the total data of the print task.

For example, in Task 1, 7 pages out of a total 10 pages are printed, and thus the print task progress defined by the printed completed portion of data out of the total data can be determined as 70%. The printer 200 may either cross-compare the total number of bytes of the print task (e.g. Task 1), which have entered through the network interface, with the number of bytes of the unprocessed part, which currently remain in the print data storage unit 230, or may either cross-compare the total number of bytes of the current print task, which have entered through the network interface, with the number of bytes that have been withdrawn from the print data storage unit 230 and printed out, thereby acquiring the print task progress. Meanwhile, Task 2 to Task 6 have not yet initiated printing, and thus the print task progress is not calculated (Null status).

The status data may further include information regarding the estimated time of print completion, along with the print task progress. The information regarding the estimated time of print completion means, when a print task is processed according on a first-input, first-output basis, the expected time to be spent until the entire print tasks that have been transmitted previously to the printer 200 are completed and the corresponding print task is complete. Therefore, the estimated time of print completion of a print task can be calculated by totaling the times to be spent by the print tasks lined up before the print task and its own print task in the order of processing the print tasks. For the purpose of convenience, it is assumed that each of the print tasks of Task 1 to Task 6 has 10 Kbytes of data per page, and for each page, 3 seconds are spent equally. Under such supposition, considering the estimated time of print completion of Task 2, a total of 9 seconds will be spent for printing the 3 unprinted pages of Task 1, and a total of 300 seconds will be spent for printing 100 pages of Task 2, therefore, the estimated time of print completion of Task 2 will be 309 seconds in total. In conclusion, the estimated time of print completion of a print task can be calculated based on the sum of bytes of the unprocessed data and its own print data, and a conventional print speed, and by providing the information regarding the estimated time of print completion to the user, the user can avoid the inconvenience of waiting in front of the printer 200 until the print task of the user has completed.

From the status data as shown in Table 1, the progress status of each print task is presented to the users requesting the print task. For example, the progress status of Task 1 and Task 3 can be presented as Tables 2 and 3 below:

TABLE 2

| Task No. | User ID | Estimated Time of Print Completion |
|---|---|---|
| Task1 | User3 | 9 sec |
| Printed Pages | Print Progress | |
| 7/10 | 70% | |

TABLE 3

| Task No. | User ID | Estimated Time of Print Completion |
|---|---|---|
| Task 3 | User1 | 339 sec |
| Printed Pages | | |
| 0/10 | | |

The network server 300 transmits information request signals to the printer 200, more specifically, to the printing status monitor unit 220, in order to determine the individual print processing status of the users that requested the print tasks. The printing status monitor unit 220 of the printer 200 generates status data representing the individual printing status, according to the request of the network server 300. Once the network server 300 acquires the status data from the printer 200, the network server 300 displays the printing status to each user, based on the acquired information. The network server 300 displays the printing status on the display panel 260 of the printer 200 or on the display window of the terminal 400, depending on the current location of the user. The determination of the current location of the user depends on the recognition of the RFID card 100 by the RFID reader 210. More specifically, the RFID reader 210 equipped in the printer 200 extracts personal identification information ID through wireless communication with the RFID card 100 that is within the maximum distance of recognition, and transfers the extracted personal identification information ID to the network server 300. Also, the network server 300 controls the printer 200 such that the printing status of the user, whose personal identification information ID has been acquired, is displayed on the display panel 260 of the printer 200, which is the expected current location of the user. In addition, for the users whose personal identification information ID has not been received, the network server 300 controls the terminals 400 such that their respective print progress information are displayed on the display window of the terminal 400, which is the expected current location of the user. By such a determination of the current location of the user and displaying the printing status either to the printer 200 or to the terminal 400 according to the determined current location of the user, the user is able to acquire the process status of the requested documents or images without a restriction in terms of location.

Figure 2:
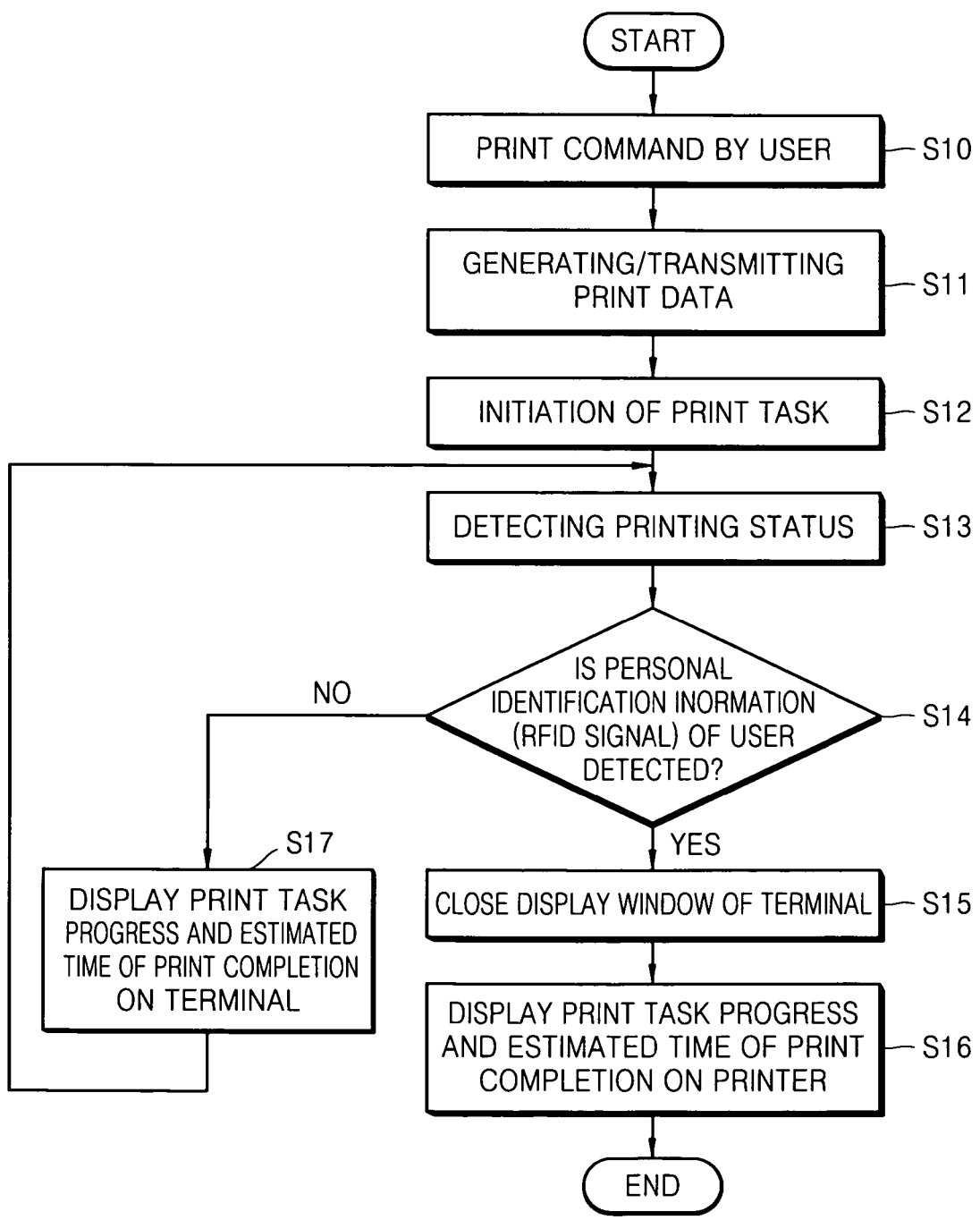
FIG. 2 is a flow chart of an example of a printing information service method according to an embodiment of the present invention, with the method illustrating a series of tasks performed before a printing is completed.

A method of providing the printing information according to an embodiment of the present invention will now be described. FIG. 2 is a flow chart of an example of a method of providing printing information. First, an application program is run on the terminal 400 according to an input of the user, and print data is generated from a text document or an image file which is requested to be printed according to the print command of the user, in a format that can be recognized by the printer 200 in steps S10 and S11. Then, a print task is initiated by entering the generated print data to the printer 200 through the network in step S12. In this example, the terminals 400 can be connected to the one common printer 200, and thus, a large number of users can share the one common printer 200, and a large number of print tasks can be requested. Also in this example, the one common printer 200 can sequentially process the print tasks received from a large number of users according to a first-input, first-output basis.

After the print task is initiated, for example, a process of detecting the individual printing status of the user may be performed at a constant time interval in step S13. Also, it is determined whether the personal identification information ID (RFID signal) is detected by the RFID reader 210 depending on a result of wireless communication between the RFID card 100 and the RFID reader 210 equipped in the printer 200 in step S14. Regarding the detection of the personal identification information ID, the RFID reader 210 equipped in the printer 200 transmits the information request signal, and the RFID card 100 that is within the maximum distance of recognition responds to the information request signal and transmits the personal identification information ID of the cardholder to the card reader 210, then the received personal identification information ID of the cardholder is transferred to the network server 300. Accordingly, the printing status may be displayed on the printer 200 where the user is expected to be located, according to the detection of the personal identification information ID. That is, if it is determined that the personal identification information ID is received in step S14, the printer 200 displays the printing status of the user whose personal identification information ID has been detected, on the display panel 260 of the printer 200, according to step S16. The application running on the terminal 400 can be controlled by the network server 300 so that the display window which displays the printing status on the terminal 400 is closed, when the printing status is displayed in the printer 200 in step S15.

Also, if it is determined that the network server does not acquire the personal identification information ID from the card reader, the printing status is displayed on the display window of the terminal 400. In this example, the information regarding the printing status may include the print task progress (e.g., 83% complete), and estimated time of print completion. After the printing information is displayed on the terminal 400, new printing information is computed according to time in step S13, the detection of personal identification information ID (RFID signal) is determined in step S14, and the printing information of the user identified by the personal identification information ID can be displayed on the printer 200 according to steps S15 and S16, from the point of detection.

In addition, the process of providing the printing information according to an embodiment of the present invention may be carried out corresponding to the location currently detected for each of the users sharing the printer 200 (e.g., users requesting printing) through the network. For example, supposing that users A and B have each requested printing, the print task status each requested printing are displayed on the terminals 400 of users A and B, but when the RFID card 100 of user A is detected by the RFID reader 210 of the printer 200, the process of providing the printing information to user A is carried out by providing the printing information to the printer 200 where the user is expected to be located, and a display location of the printing information can be redirected from the printer 200 to the terminal 400 when the RFID card of user A is no longer detected by the RFID reader 210.

Figure 3:
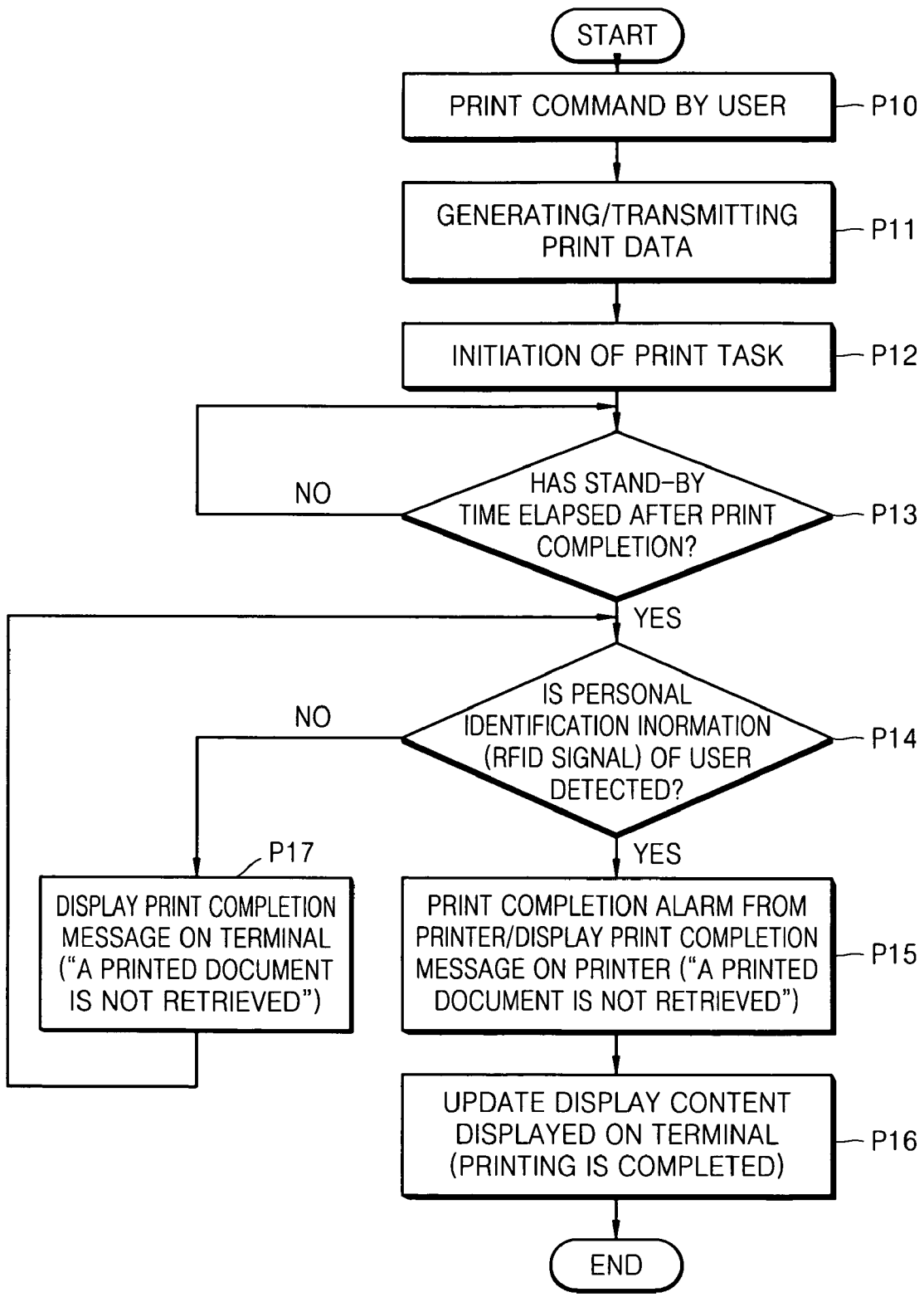
FIG. 3 is a flow chart of an example of a printing information service method according to another embodiment of the present invention, with the method illustrating a series of tasks performed after the printing is completed.

A method of providing printing information according to another embodiment of the present invention will now be described. FIG. 3 is a flow chart of an example of the method of providing the printing information, the method particularly illustrating a series of processes performed after when the printing is complete. First, the application program run in the terminal 400 generates print data from a text document or image file requested to be printed according to the user input, in a format that is recognizable by the printer 200, so that the generated data can be transmitted to the printer 200 through the network in steps P10 and P11. Accordingly, the printer 200 stores the transmitted print data to the print data storage unit 230, and commands the printing unit 240 to initiate the print task in step P12.

After the requested print task is complete, it is determined whether a preset stand-by time has elapsed in step P13, and the printer 200 generates a print completion signal according to the determined result and transmits the print completion signal to the network server 300, which responsively transmits a print completion message to the user commanding the print task, and thus notifying the user that the prints need to be retrieved. More specifically, the network server 300 determines whether the personal identification information ID (RFID signal) is detected according to the wireless communication between the RFID reader 210 equipped in the printer 200 and the RFID card 100 in step P14. The personal identification information ID can be acquired when the RFID reader 210 transfers the personal identification information ID, extracted in the wireless communication with the RFID card 100 that has entered within the distance of recognition, to the network server 300.

Once it is determined that the personal identification information ID has been acquired in step P14, the network server 300 may provide a predetermined alarm, in order to notify the print completion status of the user identified by the personal identification information ID in step P15. For example, a predetermined alarm may be produced such that the user does not pass the printer 200 without retrieving the prints therefrom. Along with, or alternative to the alarm, the print completion status of the user can be displayed on the display panel 260 of the printer 200, and a message notifying the print completion may be, for example, a phrase "A printed document is not retrieved."

If the display window notifying the printing status was initially running on the terminal 400 of the user, the displayed content on the display window is updated to display the print completion in step P16. Also, if the personal identification information ID is not acquired in step P14, the application program of the terminal 400 is controlled such that a message notifying the completion of printing, such as a phrase "A printed document is not retrieved," is displayed in step P17 on the display window of the terminal 400. After displaying the print completion message on the terminal 400, the detection of personal identification information ID (RFID signal) of the user can be determined in step P14, the print completion alarm or the print completion message may be provided to the printer 200 where the user is expected to be located at the point of detection, according to step P15.

In addition, the method of providing print information described with reference to FIG. 3 involves notifying the retrieval of the prints to the user, whose requested print task has been completed, among a plurality of users sharing the printer 200. For example, among users A, B, and C that are sharing the printer 200, if the print task requested by user A, and an assigned stand-by time has elapsed, whether the personal identification information ID of user A can be acquired is determined, and according to the determined result, the print completion status is notified on the printer 200 or the terminal 400 where the user is expected to be located.

The embodiments of the present invention provide real-time or substantially real-time notification of a printing status to a user that has requested a print task, and thus convenience the user, and significantly improves the productivity of the user. In particular, the present invention recognizes the current location of the user based on RFID technology, providing printing information according to current locations of the user, and thereby significantly enhancing the convenience of executing print tasks from the point of view of the user.

Moreover, by providing an alarm and/or a print completion message individually to the user once the print task is complete, the time wasted in waiting a long time in front of the printer for the printing to be completed can be reduced, and by informing to immediately retrieve the prints of the user for each print completion, a large number of printed documents being left on the tray of the printer feeder for a long time can be prevented. At the same time, it is unnecessary for the user to tediously manually check for his or her prints among the large number of prints that have accumulated on the feeder tray.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of providing printing information, the method comprising:
   detecting a printing status of printing tasks requested from a user, with the user having a radio frequency identification (RFID) card;
   determining whether a RFID reader equipped in a printer detects the RFID card of the user, depending on a communicating distance between the RFID reader and the RFID card of the user;
   providing information by displaying, at the printer, the printing status of the user, if the RFID card of the user is detected; and
   displaying, on a terminal of the user, the printing status of the user, if the RFID card of the user is not detected.

2. The method of claim 1, wherein the determining comprises:
   determining whether a personal identification information stored in the RFID card of the user is acquired, as a result of the communicating between the RFID reader and the RFID card of the user.

3. The method of claim 2, wherein the providing information comprises:
   displaying, at the printer, the printing status of the user represented by the personal identification information.

4. The method of claim 2, wherein the personal identification information is a unique ID registered to the RFID card, so as to identify the card holder among users sharing the printer.

5. The method of claim 1, wherein the printing status information includes at least one type of information selected from the group consisting of print completion, print progress, and estimated time of print completion.

6. The method of claim 5, wherein the print progress is displayed as a quantitative percentage of print data that has completed printing, with respect to a total print data requested by the user.

7. A method of providing printing information, the method comprising:
   (a) determining whether a preset stand-by time has elapsed after printing is complete;
   (b) determining whether a radio frequency identification (RFID) reader equipped in a printer detects a RFID card of a user whose printing is complete, depending on a communicating distance between the RFID reader and the RFID card of the user when the stand-by time is determined to be elapsed;
   (c) providing information, via the printer, by notifying the print completion status of the user, when the RFID card of the user is detected; and
   (d) notifying, via a terminal of the user, the print completion status of the user, when the RFID card of the user is not detected.

8. The method of claim 7, wherein the determining of step (b) comprises:
   determining whether a personal identification information stored in the RFID card of the user is acquired, as result of the communicating between the RFID reader and the RFID card of the user.

9. The method of claim 8, wherein the providing information comprises:
   notifying, via the printer, the print completion status of the user represented by the personal identification information.

10. The method of claim 8, wherein the personal identification information is a unique ID registered to each RFID card of a plurality of users sharing the printer, so as to identify each card holder among the users sharing the printer.

11. The method of claim 7, wherein the providing information of step (c) comprises producing a preset alarm.

12. The method of claim 7, wherein the providing information of step (c) comprises displaying a print completion message on a display screen of the printer.

13. A printing information service system comprising:
   at least one terminal which generates a print data according to a print request of a user;
   a printer which is equipped with a radio frequency identification (RFID) reader and performs a printing task by acquiring the print data;
   an RFID card which transmits a personal identification information of a cardholder of the RFID card depending on a communication distance between the RFID reader and the RFID card; and
   a network server which indicates a printing status of the user represented by the personal identification information, at the printer, if the personal identification information is acquired according to the communication distance between the RFID reader and the RFID card, and which displays the printing status of the user on a display screen of a terminal of the user if the personal identification information is not acquired according to the communication distance between the RFID reader and the RFID card.

14. The system of claim 13, wherein the printer comprises a printing status monitor unit for generating a status data relating to the printing status of the user.

15. The system of claim 14, wherein the status data comprises at least one type of information selected from the group consisting of printing completion, print progress, and estimated time of print completion.

16. The system of claim 15, wherein the print progress is displayed as a quantitative percentage of the print data that has completed printing, with respect to a total print data requested by the user.

17. The system of claim 16, wherein the total print data requested by the user is an entire data that has entered the printer through a network interface.

18. The system of claim 16, wherein the printer comprises a printing data storage unit which temporarily stores data received from a plurality of terminals connected to a network, and the print data that has completed printing is determined based on an amount of data remaining in the storage unit, not yet processed.

* * * * *